US010395022B2

(12) United States Patent
Rowlingson

(10) Patent No.: US 10,395,022 B2
(45) Date of Patent: Aug. 27, 2019

(54) ACCESS CONTROL FOR A RESOURCE

(71) Applicant: British Telecommunications Public Limited Company, London (GB)

(72) Inventor: Robert Rowlingson, London (GB)

(73) Assignee: British Telecommunications Public Limited Company, London (GB)

( * ) Notice: Subject to any disclaimer, the term of this patent is extended or adjusted under 35 U.S.C. 154(b) by 183 days.

(21) Appl. No.: 15/120,566

(22) PCT Filed: Mar. 5, 2015

(86) PCT No.: PCT/GB2015/050640
§ 371 (c)(1),
(2) Date: Aug. 22, 2016

(87) PCT Pub. No.: WO2015/132596
PCT Pub. Date: Sep. 11, 2015

(65) Prior Publication Data
US 2017/0011212 A1    Jan. 12, 2017

(30) Foreign Application Priority Data

Mar. 7, 2014  (EP) .................................... 14250036

(51) Int. Cl.
*G06F 21/36* (2013.01)
*G06T 5/00* (2006.01)
(Continued)

(52) U.S. Cl.
CPC .............. *G06F 21/36* (2013.01); *G06T 5/002* (2013.01); *G06T 5/50* (2013.01); *G06T 11/60* (2013.01);
(Continued)

(58) Field of Classification Search
CPC ..................................................... G06F 21/36
(Continued)

(56) References Cited

U.S. PATENT DOCUMENTS

2007/0250920 A1 * 10/2007 Lindsay .................. G06F 21/31
726/7
2008/0127302 A1 * 5/2008 Qvarfordt ............... G06F 21/36
726/2
(Continued)

FOREIGN PATENT DOCUMENTS

EP       2 330 529 A2     6/2011
EP         2330529 A2 *   6/2011   ............. G06F 21/36

OTHER PUBLICATIONS

Chew et al., "BaffleText: A Human Interactive Proof," Proceedings of SPIE, vol. 5010 (Jan. 20, 2003), XP055134176; 11 pages.
(Continued)

*Primary Examiner* — David J Pearson
(74) *Attorney, Agent, or Firm* — Patterson Thuente Pedersen, PA

(57) ABSTRACT

An access controller comprising: a data store storing: a challenge image including a user challenge; a mask image including a mask; a composite image generator to superimpose the challenge image and the mask image as a dynamic composite image such that the user challenge is partially masked by the mask in the composite image; and a display to display the dynamic composite image to a user; a user input receiver, wherein the access controller grants access to the resource on receipt, via the user input receiver, of a correct response by a user to the challenge, wherein the user challenge is at least 70% masked by the mask, wherein the user challenge is indistinguishable from the mask at boundaries between the user challenge and the mask in the composite image, and wherein the composite image is dynamic by the mask randomly moving in the composite image periodically.

17 Claims, 8 Drawing Sheets

(51) Int. Cl.
  *G06T 5/50* (2006.01)
  *G06T 11/60* (2006.01)
  *G06T 13/80* (2011.01)
(52) U.S. Cl.
  CPC ...... *G06T 13/80* (2013.01); *G06F 2221/2133* (2013.01); *G06T 2207/10024* (2013.01)
(58) Field of Classification Search
  USPC .......................................................... 726/7
  See application file for complete search history.

(56) References Cited

U.S. PATENT DOCUMENTS

| | | | | |
|---|---|---|---|---|
| 2008/0216163 | A1* | 9/2008 | Pratte | G06F 21/316 726/7 |
| 2010/0251388 | A1* | 9/2010 | Dorfman | G06F 21/36 726/29 |
| 2010/0302255 | A1* | 12/2010 | Brown | G06T 1/0021 345/473 |
| 2011/0029902 | A1* | 2/2011 | Bailey | G06F 21/36 715/764 |
| 2012/0008432 | A1 | 1/2012 | Liao | |
| 2012/0084832 | A1* | 4/2012 | Punera | H04L 9/3271 726/2 |
| 2012/0246737 | A1* | 9/2012 | Paxton | G06F 21/316 726/27 |
| 2013/0276079 | A1* | 10/2013 | Foulds | H04L 63/08 726/7 |
| 2015/0143495 | A1* | 5/2015 | Okada | G06F 21/31 726/7 |
| 2017/0093920 | A1 | 3/2017 | Ducatel et al. | |
| 2017/0099278 | A1 | 4/2017 | Ducatel et al. | |

OTHER PUBLICATIONS

Mitra et al., "Emerging Images," ACM Transactions on Graphics (Dec. 2009) vol. 28, No. 5, Article 163; 8 pages.

Xu et al., "Security and Usability Challenges of Moving-Object CAPTCHAs—Decoding Codewords in Motion," 21st USENIX Security Symposium (2012); 34 pages.

International Search Report for corresponding International Application No. PCT/GB2015/050640 dated May 29, 2015; 4 pages.

Written Opinion for corresponding International Application No. PCT/GB2015/050640 dated May 29, 2015; 6 pages.

* cited by examiner

ACCESS CONTROL FOR A RESOURCE

CROSS-REFERENCE TO RELATED APPLICATIONS

The present application is a National Phase entry of PCT Application No. PCT/GB2015/050640, filed on 5 Mar. 2015, which claims priority to EP Patent Application No. 14250036.2, filed on 7 Mar. 2014, which are hereby fully incorporated herein by reference.

TECHNICAL FIELD

The present disclosure relates to access control for a resource in a computer system. In particular it relates to providing access control based upon a verification relating to a user of a computer system.

BACKGROUND

It can be necessary to verify that a user of a computer system is a person, as opposed to an entity mimicking a person such as a software agent. For example, this verification is required to detect and/or prevent abuse of resource such as free services available on the internet including: electronic mail services; forum databases; data lookup facilities; and commercial ticketing or quotation systems. Such services are prone to abuse since there may be no financial charge associated with use of the services (and therefore no payment information is required) and access to the services is typically via internet web pages including web forms which are easily navigated by automated agents. Such abuse can take the form of an automated agent consuming vast quantities of resource, misappropriating resources, abusing resources (such in the case of an internet email system used to generate many email addresses for the distribution of SPAM messages), or an automated website offering consolidated commercial quotations from multiple vendors by automatically obtaining quotations from individual vendor quotation systems.

One way to achieve the required verification is to request that a user interpret an obfuscated image of an alphanumerical code. For example, FIG. 1 illustrates an alphanumeric code which has been obfuscated in an attempt to verify that a user of a computer system is a person. The user is requested to interpret and input the alphanumeric code (which is "9R8Kmc" in this example, though such a code could equally consist solely of numeric or alphabetic characters). The drawback of this approach is that the alphanumeric code must always be legible enough for a person to interpret. As long as the code is legible in this sense, it is always going to be possible to provide a software system which is also able to decipher the code. For example, a software application which applies filters to aspects of the obfuscated image to reverse obfuscation of the code along with known approaches to character recognition, is conceivably able to interpret the code. Consequently, it has become necessary to increase a degree of obfuscation such that the alphanumeric code becomes increasingly distorted in order to reduce the risk of interpretation by a software agent. However, as the alphanumeric code is increasingly distorted, a risk that a human user is unable to interpret the code increases. A compromise must therefore be reached using this conventional approach between a satisfactory level of distortion of the alphanumeric code to avoid being cracked by a software agent versus a sufficiently low level of distortion to be interpretable by a human user. This balance represents a compromise in the effectiveness of the technique as a means for distinguishing human users from software agents.

US Pat. App. Pub. No. US2012/008432A1 discloses a time managed challenge-response test using a graphical pattern to reveal individual alphanumeric characters of an entry object, the pattern having an area free of graphical elements. The area free of graphical elements is moved in such a way as to reveal an entire portion of an entry object over a period of time. Approaches to human verification such as are disclosed in US2012/008432A1 in which a challenge is entirely revealed, whether momentarily or progressively over a period of time, are necessarily subject to deception by the likes of automated software agents since there is inherently a full disclosure of the challenge which is readily subjected to character recognition.

The robustness of moving-image object recognition CAPTCHAs ("Completely Automated Public Turing test to tell Computers and Humans Apart") is considered in "Security and Usability of Moving-Object CAPTCHAs: Decoding Codewords in Motion" (Xu et al., 21st USENIX Security Symposium, 2012). Xu et al. present an automated attack to defeat moving image object recognition CAPTCHAs such as those provided by NUCaptcha (NUCaptcha is a trademark or registered trademark of Leap Companies). NUCaptcha provides human verification tests such as a streamed video containing moving text against a dynamic background. Xu et al. describe an attack involving: accessing a video stream; applying object tracking techniques to infer motion of salient feature points; extracting foreground pixels based on a measure of likelihood of a pixel belonging to a background; segmenting the foreground; and classifying candidate characters using a neural network based classifier. The classifier outputs a likelihood score that an image patch contains a character for feedback to the process.

Xu et al. further describe an approach named "Emerging CAPTCHAs" to mitigating such attacks based on the paper "Emerging Images" (Mitra et al., ACM Transactions on Graphics, 28(5), 2009). Mitra et al. describe the phenomenon of "Emergence" by which humans perceive objects in an image not by recognizing the object parts, but as a whole, all at once. Mitra et al. provide an algorithm for generating an image that remains recognizable to a human, while to a bot the image appears as a collection of meaningless patches. The algorithm of Mitra et al. involves: generating an "importance map" of importance values for each vertex in a mesh of a 3D geometry of a scene; rendering a subject using the importance map; generating "splat centers" (the centers of large dots known as "splats") according to the importance map; perturbing or deleting patches along a silhouette of the subject; and adding clutter to the image using a cut-perturb-paste approach to hide the location of the emergence figure. Xu et al.'s Emerging CAPTCHAs are an adaptation of the approach of Mitra et al. to 2D characters instead of 3D objects. Xu et al. observes benefits of Emerging CAPTCHAs including a benefit that no single frame contains a codeword in a way that is easy to segment, and that, in each frame, there are not enough visual cues that help distinguish the characters from the background. Xu et al. conclude that the attack described in Xu et al. fails in respect of Emerging CAPTCHAs.

Despite the benefits of the approach of Xu et al. to generating Emerging CAPTCHAs, the generation process itself is a burdensome overhead. While it may be acceptable to render a moving video or animation CAPTCHA for transmission to a user over a network, as is undertaken by NUCaptcha, to undertake the full algorithm of Mitra et al.

dynamically for each CAPTCHA is a considerable overhead, especially in view of a preference for CAPTCHAs to be individual, unique and/or random to prevent ready recognition. It would therefore be advantageous to provide a mechanism for verifying that a user of a computer system is a person, as opposed to an entity mimicking a person, which mechanism is not reliant upon increasing a degree of obfuscation of alphanumerics since these can potentially be interpreted by a software routine or are potentially not interpretable by a human user, and which mechanism does not suffer the burdens and disadvantages of Xu et al. and Mitra et al. including, inter alia, those disadvantages identified above.

SUMMARY

The present disclosure accordingly provides, in a first aspect, an access control method for a resource in a computer system comprising: generating a challenge image including a user challenge; generating a mask image including a mask; generating a dynamic composite image comprising the challenge image and the mask image superimposed such that the user challenge is partially masked by the mask; and granting access to the resource on receipt of a correct response by a user of the computer system to the challenge, wherein the user challenge is at least 70% masked by the mask, wherein the user challenge is indistinguishable from the mask at boundaries between the user challenge and the mask in the composite image, and wherein the composite image is dynamic by the mask randomly moving in the composite image periodically.

Thus, in embodiments of the present disclosure, there are never enough visual cues in the composite image at any moment to distinguish the user challenge from the mask and the user challenge is not discernible at any instant point in time from the composite image. The user challenge becomes discernible and answerable over time by a human due to the random movement of the mask in the composite image which constitutes a movement relative to the user challenge. In accordance with the gestalt principle of prägnanz, a human viewer will identify elements of familiarity and regularity to discern the user challenge in the composite image. The identification of the user challenge arises at least partly due to the gestalt laws of continuity and familiarity prompted by the random movement of the mask. Notably, the extent of masking of the user challenge will mean that more than 70% of the user challenge will be masked at any point in time and so it is only once the human vision system, having focused on the composite image for a period of time, discerns the user challenge that an appropriate challenge response can be provided. Where the challenge response is correct, access to the resource can be provided. A software agent, bot or the like will be unable to discern the user challenge from any momentary state of the composite image. Further, even after an elapsed period of time, the user challenge will remain considerably masked and indistinguishable from the mask.

The present disclosure accordingly provides, in a second aspect, an access controller for a resource in a computer system, the access controller comprising: a data store having stored therein: a challenge image including a user challenge; a mask image including a mask; a composite image generator adapted to superimpose the challenge image and the mask image as a dynamic composite image such that the user challenge is partially masked by the mask in the composite image; and a display adapted to displaying the dynamic composite image to a user; a user input receiver, wherein the access controller is adapted to grant access to the resource on receipt, via the user input receiver, of a correct response by a user of the computer system to the challenge, wherein the user challenge is at least 70% masked by the mask, wherein the user challenge is indistinguishable from the mask at boundaries between the user challenge and the mask in the composite image, and wherein the composite image is dynamic by the mask randomly moving in the composite image periodically.

In an embodiment, the random movement of the mask is characterized by the mask moving in the composite image in a random direction independently determined for each period.

In an embodiment, the user challenge periodically moves in the composite image in a random direction independently determined for each period. Thus, in a preferred embodiment, both the mask and the user challenge are moved randomly. This prevents a software agent from identifying aspects of the composite image that never change as candidate aspects for the determination of the user challenge.

In an embodiment, the user challenge comprises a plurality of challenge elements and wherein each challenge element periodically moves in a random direction independently determined for each period.

In an embodiment, the mask comprises a plurality of mask elements, the mask elements having spaces therebetween for revealing portions of the user challenge.

In an embodiment, the mask elements are random elements in at least one of: element size; and element location in the mask image.

In an embodiment, the mask moves by movement of individual mask elements, each mask element moving in a random direction independently determined for each period.

In an embodiment, the user challenge is at least 80% masked by the mask and at most 94% masked by the mask.

In an embodiment, the user challenge includes colors and the mask consists exclusively of colors of the user challenge so as to provide that the user challenge is indistinguishable from the mask at boundaries between the user challenge and the mask in the composite image.

In an embodiment, the user challenge and the mask are provided in substantially the same color so as to provide that the user challenge is indistinguishable from the mask at boundaries between the user challenge and the mask in the composite image.

In an embodiment, the composite image is periodically recorded so as to generate a plurality of frames of the composite image.

In an embodiment, the plurality of frames are presented to the user as an animation.

In an embodiment, the animation is provided in a video data format.

In an embodiment, the composite image is generated at a first computer system and communicated to a second computer system for provision to a user, and the user response is received from the second computer system by the first computer system.

The present disclosure accordingly provides, in a third aspect, a computer program element comprising computer program code to, when loaded into a computer system and executed thereon, cause the computer to perform the steps of the method set out above.

BRIEF DESCRIPTION OF THE DRAWINGS

Embodiments of the present disclosure will now be described, by way of example only, with reference to the accompanying drawings, in which.

DETAILED DESCRIPTION OF EMBODIMENTS

Figure 1:
FIG. 1 illustrates an alphanumeric code which has been obfuscated in a conventional approach.
Figure 2:
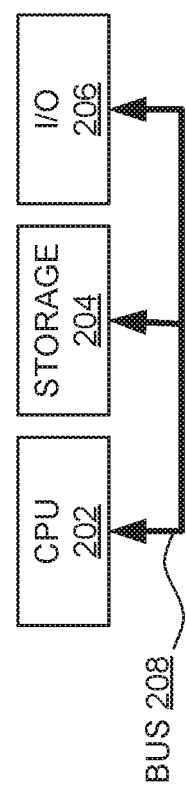
FIG. 2 is a block diagram of a computer system suitable for the operation of embodiments of the present disclosure.

FIG. 2 is a block diagram of a computer system suitable for the operation of embodiments of the present disclosure. A central processor unit (CPU) 202 is communicatively connected to a storage 204 and an input/output (I/O) interface 206 via a data bus 208. The storage 204 can be any read/write storage device such as a random access memory (RAM) or a non-volatile storage device. An example of a non-volatile storage device includes a disk or tape storage device. The I/O interface 206 is an interface to devices for the input or output of data, or for both input and output of data. Examples of I/O devices connectable to I/O interface 206 include a keyboard, a mouse, a display (such as a monitor) and a network connection.

Figure 3:
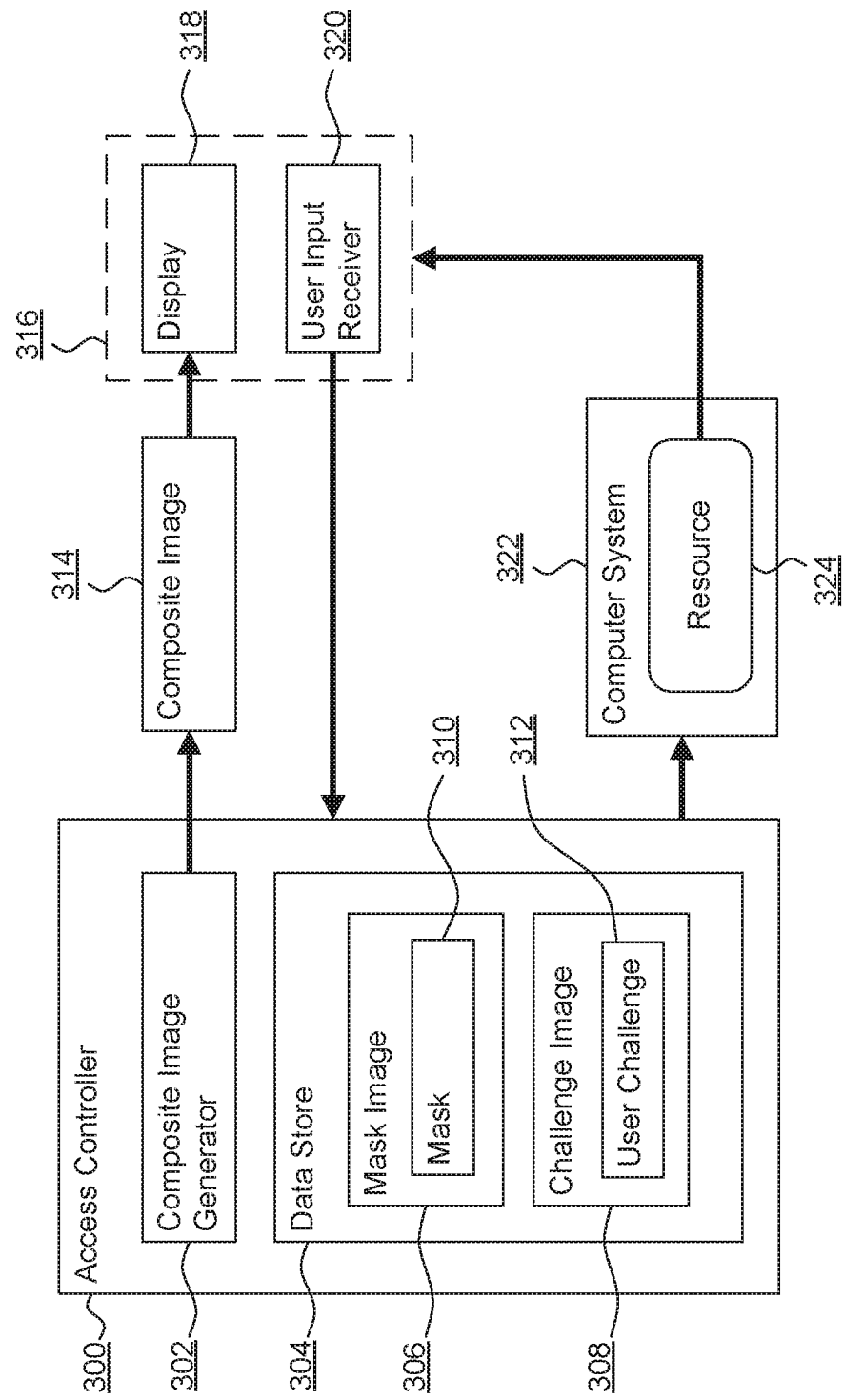
FIG. 3 is a component diagram of an access controller for a resource in a computer system in accordance with embodiments of the present disclosure.

FIG. 3 is a component diagram of an access controller 300 for a resource 324 in a computer system 322 in accordance with embodiments of the present disclosure. The access controller 300 is a hardware, software or firmware component for providing restricted access to the resource 324 in the computer system 322. The resource can be any resource for which restricted access may be desired, such as hardware, software or firmware resources, software applications, software components, software services, web services, cloud computing services and the like. For example, the resource is a web service for the provision of electronic messaging such as email. Alternatively, the resource is a commercial web service such as a retail, electronic commerce, quotation, directory search, lookup, database access, forum, social network or other service. The access controller 300 provides restricted access in that the access controller 300 is adapted to undertake a verification process to verify that a requester requesting access to the resource 324 is a human as opposed to an entity mimicking a human. Entities that mimic humans include software components such as software agents, automated software robots, bots, or any other software, hardware or firmware component adapted to mimic a human. The extent of such mimicking of human characteristics need only go so far as to seek access to the restricted resource 324 by seeking to mimic human responses to access control challenges presented to verify human requesters, such as CAPTCHA challenges and the like.

The access controller 300 includes a data store 304 such as a volatile or non-volatile storage, disk, tape, memory or other suitable store. The data store 304 can be arranged to include a database, data structure, lookup table or other suitable arrangements. A challenge image 308 and a mask image 306 are stored in the data store. The challenge image 308 is a representation of visualizable information such as a compressed or uncompressed digital image or a textual image such as an ASCII representation of an image. For example, the challenge image 308 is a compressed or uncompressed bitmapped or vector defined image. Alternatively, the challenge image 308 can be an animated image comprising a number of separate frames, whether compressed or not, or other moving image such as a video image. The challenge image 308 includes a user challenge 312 as an access control challenge for a user. The user challenge 312 has associated a correct response, receipt of which by the access controller 300 causes the access controller 300 to grant access to the resource 324 for a requesting user. The user challenge 312 can be a self-contained challenge such that the challenge 312 prompts a user to provide a response. Alternatively, the user challenge 312 can be accompanied by an instruction, request, guidance or other information for so prompting. The user challenge 312 can be constituted as a sequence of alphabetic, numeric or alphanumeric characters with a correct response being the sequence of characters. Alternatively, the user challenge 312 can be constituted as a drawing, picture, illustration or other such suitable challenges for a user.

The mask image 308 is a representation of a visualizable information such as a compressed or uncompressed digital image. For example, the challenge image 308 is a compressed or uncompressed bitmapped or vector defined image. The mask image 306 includes a mask 310 as an image component. The mask 310 can be defined as one or more portions, regions or elements of the mask image 306. For example, the mask 310 can be defined by bitmapped portions, regions or elements. Alternatively, the mask 310 can be defined by a plurality of vector specifications of portions, regions or elements. In one embodiment, the mask 310 is constituted as a data structure of definitions of portions, regions or elements, such as definitions of points or regions within the mask image 310. Such a data structure can be implemented as an array or similar, or as a list or array of records or data structures.

The challenge image 308 and the mask image 306 are suitable for being superimposed to generate a composite image 314 such that the user challenge 312 is partially, but not completely, masked by the mask 310. In some embodiments, to achieve such partial and incomplete masking of the user challenge 312 by the mask 310, it is necessary that one or both of the mask image 306 and the challenge image 308 include transparent, non-colored or absent portions as the portions not constituting the user challenge 312 and/or the mask 310. For example, portions of the mask image 306 not being the portions, regions or elements constituting the mask 310 can be transparent in the mask image such that when the mask image is superimposed over the challenge image 308 the user challenge 312 is partially masked by the mask 310 such that unmasked portions of the challenge image 308 are visible through transparent portions of the mask image 306. It will be appreciated by those skilled in the art that this is only one suitable approach to achieving such an effect and other such suitable approaches could alternatively be employed. For example, the mask image 306 can be a graphical image in a format supporting transparent portions, layers, background, pixels and the like, such as the Portable Network Graphics (PNG) format or a vector specification of the mask image 306 including a vector, data structure or other suitable definition of the mask 310. A vector or data structure based definition of the mask 310 can be rendered atop (or behind) the challenge image 308 to achieve the required superimposition. Where used herein, rendering a first image atop a second image is taken to mean that the first image has a greater i-order than the second image such that the first image can be considered to be in front of the second image.

Further or alternatively, and as described above, the challenge image 308 can be provided with transparent, non-colored or absent portions as portions not constituting the user challenge 312. This is effective where the colors of the user challenge 312 are substantially the same as the colors of the mask 310 in order that the superimposition of the challenge image 308 atop the mask image 306 does not lead to a composite image 314 in which the user challenge 312 is readily distinguished from the mask 310. It will be appreciated that, in such an arrangement, the mask 310 does not achieve its masking effect by literally laying over (or being atop) the user challenge 312, and instead the mask 310 has its masking effect by virtue of the substantial identity of the colors of the mask and the user challenge rendering the distinction between each unidentifiable on instant observation.

In accordance with embodiments of the present disclosure, and to achieve the desired advantageous effects of verifying human users, a user challenge 312 portion of the composite image 314 is indistinguishable from a mask 310 portion of the composite image 314 at least at the boundaries between the user challenge 312 and the mask 310 in the composite image 314. Most advantageously, the user challenge 312 is indistinguishable from the mask 310 throughout the composite image 314. Such indistinguishability can be achieved by using identical colors, textures, images or the like in the definition of the user challenge 312 and the mask 310. For example, a user challenge 312 defined as black characters can be rendered indistinguishable from the mask 310 following superimposition to form the composite image 314 by defining the mask 310 also in terms of black elements. Identity of the colors of the user challenge 312 and the mask 310 is not necessarily required. Identity of a set of colors used to constitute both the user challenge 312 and the mask 310 can be sufficient, though it will be appreciated that discernible differences between the definition of the user challenge 312 and the mask 310 can undermine the effectiveness of the present technique, where 'discernible' means discernible to, for example, a software agent or bot which may be capable of identifying exact red, green and blue (RGB) component values for any color used in an image.

Further, in accordance with embodiments of the present disclosure, and to achieve the desired advantageous effects of verifying human users, the user challenge 312 is at least 70% masked by the mask 310 in the composite image 314, whether such masking is achieved by overlaying the mask image 308 or by the combined effect of the mask 310 and the user challenge 312 where the challenge image 308 is overlaid on the mask image 308. Where the masking is less than 70% it is observed that the user challenge 312 is generally discernible readily by a human user and also may be readily discernible using techniques for attacking human verification challenges, such as those described by Xu et al. In contrast, an extent of masking of at least 70%, such as greater than 70%, tends towards a composite image 314 in which, when the composite image 314 is static (meaning when the composite image 314 is considered at a moment in time, as opposed to the composite image changing periodically over time as will be described below), the user challenge 312 is neither discernible by a human user or an automated technique such as described by Xu et al. This effect arises since there are insufficient visual cues in the composite image 314 to distinguish the user challenge 312 from the mask 310. The absence of visual cues arises as a result of the indistinguishability of the user challenge 312 and the mask 310 at least at the boundaries between the user challenge and the mask, along with the substantial extent of masking of the user challenge 312 being at least 70%. Thus, on inspection of the composite image 314 at a point in time, it is not possible for a human to readily discern, with 100% accuracy, the correct response to the user challenge 312. Correspondingly, it is not possible for an automated software agent, bot or the like to discern the correct response.

In a more advantageous embodiment, the extent of masking of the user challenge 312 is at least 80% and at most 94%. Masking to an extent greater than 94% can render the user challenge 312 entirely unidentifiable. Further advantageously, the extent of masking is at least 85% and at most 92%. In a most advantageous embodiment, the extent of masking is 90%.

The composite image 314, as a superimposition of the challenge image 312 and the mask image 310, is generated by the composite image generator 302. The composite image generator 302 can be a software, hardware or firmware component and is further operable to generate the composite image 314 as a dynamic composite image. The composite image 314 is dynamic in that it changes periodically by a portion of the composite image 314 constituting the mask 310 moving randomly in the composite image. The periodic movement of the mask 310 in the composite image 314 is a movement of the mask 310 at regular intervals of time. The period, or interval, of the periodic movement of the mask 310 is defined to be sufficiently short that, when the dynamic composite image 314 is rendered for display to a user, any persistence of vision effect by a human is triggered so as to observe the movement of the mask 310 relative to the user challenge 312. It has been observed that periods of at most 150 milliseconds can be effective, and preferably periods of at most 100 milliseconds. In an advantageous embodiment, the period is at least 10 milliseconds and at most 10 milliseconds. Thus, in use, a human user is able to discern the user challenge 312 over time on observation of the dynamic composite image 314 due to the random movement of the mask in the composite image which constitutes a movement relative to the user challenge. A human user is able to discern the user challenge 312 as a consequence of any persistence of vision of the human user and human cognitive traits such as the gestalt principle of prägnanz and the gestalt laws of, inter alia, continuity and familiarity. It will be appreciated that a human user may be required to observe the dynamic composite image 314 for a span of time before the user challenge 312 can be observed, such a span being long enough to cover multiple periods of movement in the dynamic composite image 314 to enjoy the benefits of the human cognitive recognition processes.

The dynamic composite image 314 is provided to a user by presentation, rendering or otherwise providing via a display 318 such as a screen, window or other suitable output device. On recognition of the user challenge 312 by the human user, a response to the challenge is provided by the user via a user input receiver 320 such as suitable user input devices (including keyboard, touchscreen, camera, voice input and the like). The user response is received by the access controller 300 which is adapted to grant access to the resource 322 if the user response is the correct response for the user challenge 312.

The resource 324 is associated with a computer system 322. The computer system 322 can additionally host, provide or include the access controller 300 or, alternatively, the access controller 300 can be provided separate to, and in communication with, the computer system 322. Advantageously, the computer system 322 is distinct to a system 316 at which the user requests or seeks access to the resource 324. For example, the user system 316 can be a user terminal, personal computer, pervasive device, smartphone, television, set-top box or any other suitable user device as will be apparent to those skilled in the art. Thus, in some embodiments, the dynamic composite image 314 is generated by the access controller 300 at a first computer system and communicated to the user system 316 as a second computer system, and the user response is received from the second computer system by the first computer system. In this way the component parts of the composite image 314 including, in particular, the user challenge 312 and challenge image 308, can be protected from direct inspection at the user system 316 since they are not available at the user system 316 except by way of the dynamic composite image 314 requiring human cognitive skill to discern the user challenge 312.

In one embodiment, the dynamic composite image 314 is communicated to the user system 316 as part of, embedded within, or constituted by a television signal, such as a digital television signal to a set top box as the user system. Further, in one embodiment, the user response is communicated via the set top box to the access controller 300.

Advantageously, the composite image 314 is rendered as an animated image, such as an animated Graphics Interchange Format (GIF) image, or a media format such as a film, movie or other suitable format for displaying the dynamic composite image 314. The dynamic composite image 314 could be provided for display in a specification format for specifying the mask 310 and user challenge 312 components, with such dynamic features of the movement of the mask 310 component being achieved in real-time. Such an approach is effective though has a downside in that the separate features of the composite image 314, being the mask 310 and user challenge 312, might be separable under attack at the user system 316 if they are communicated to the user system 316. Even if the separate components are encrypted for communication and receipt at the user system 316, any facility at the user system to decrypt such separate components to render the composite image 314 "on-demand" at the user system 316 can also be susceptible to attack. Thus, while such an approach is effective, it is preferably avoided unless accompanied by secure means for both communication of the specification of the composite image 314 and for rendering the dynamic composite image 314 for display at the user system 316.

In one embodiment, the access controller 300 includes a recorder component (not shown) as a software, hardware or firmware component adapted to record the dynamic composite image 314 rendered periodically so as to generate a plurality of frames of the composite image 314 in order that a representation of the dynamic composite image 314 can be communicated to the user system 316 as, for example, an animated graphic, a video or other suitable media. For example, the dynamic composite image 314 can be streamed to the user system 316. In an alternative embodiment, the dynamic composite image 314 is streamed to the user system 316 during real-time rendering of the composite image 314 at the access controller 300.

In some embodiments, the random movement of the mask 310 component of the dynamic composite image 314 is realized by the mask 310 moving in the composite image 314 in a random direction independently determined for each period. Thus, in this way, the mask 310 can move as a whole in random directions after each interval.

In some embodiments, the user challenge 312 also moves periodically in the dynamic composite image 314 in a random direction independently determined for each period. The period of movement of the user challenge 312 in the dynamic composite image 314 may not be synchronized with the period of movement of the mask 310 component. The lack of synchronization can manifest as either out-of-phase periodic movement of the user challenge 312 and the mask 310, or by different periods or intervals of periodic movement, or both. Movement of the user challenge 312 in the dynamic composite image 314 in addition to the mask 310 is particularly advantageous since such movement protects against attacks by automated software agents or bots which seek to identify parts of the composite image 314 that never move, which over time can be identified as likely parts corresponding to the user challenge 312. Thus, introducing movement of the user challenge 312 avoids such attacks. Notably, the user challenge 312 component of the composite image 314 must move differently to the mask 310 component, either due to a lack of synchronization of the components or a difference in the direction of movement after some or all periods. The randomness of the movement of both the mask 310 and the user challenge 312 components provides for a lack of regularity in the movement of the components to avoid tracking the movement of the components by an automated agent or bot.

In some embodiments, the user challenge 312 comprises a plurality of challenge elements and wherein each challenge element periodically moves in the composite image 314 in a random direction independently determined for each period. Thus, for example, individual letters of an alphanumeric user challenge 312 can be adapted to move separately and potentially differently to introduce further cognitive demands on the user to discern the challenge.

In some embodiments, the mask 310 comprises a plurality of mask elements, the mask elements having spaces therebetween for revealing portions of the user challenge as hereinbefore described. Advantageously the mask elements are random elements in that they have random size and/or are located at random locations in the mask image 306. Most advantageously the mask elements are distributed substantially across the entirety of the mask image 306 at random locations with substantially consistent density. Advantageously, the movement of the mask 310 component of the dynamic composite image 314 is achieved by movement of the individual mask elements. For example, each mask element in the mask 310 can move in a random direction independently determined for each period. In this way the mask 310 becomes highly variable in the dynamic composite image 314.

In some embodiments, the mask 310 component of the composite image 314 is provided as a predetermined animation or video in an animation of video data format. Advantageously, such predetermined animation or video is dynamically and randomly generated to preclude for anticipation attacks based on prior knowledge of the nature of the mask. Similarly, the user challenge 312 can be provided as a predetermined animation or video.

Thus, in embodiments of the present disclosure, there are never enough visual cues in the dynamic composite image 314 at any moment to distinguish the user challenge 312 from the mask 310 and the user challenge 312 is not discernible at any instant point in time from the composite image 314. The user challenge 312 becomes discernible and answerable over time due to the random movement of the mask 310 in the dynamic composite image 314 which constitutes a movement relative to the user challenge 312. In accordance with the gestalt principle of prägnanz, a human viewer will identify elements of familiarity and regularity to discern the user challenge 312 in the composite image 314. The identification of the user challenge 312 arises at least partly due to the gestalt laws of continuity and familiarity prompted by the random movement of the mask 310. Notably, the extent of masking of the user challenge 312 will mean that more than 70% of the user challenge 312 will be masked at any point in time and so it is only once the human vision system, having focused on the dynamic composite image 314 over time, discerns the user challenge 312 that an appropriate challenge response can be provided. Where the challenge response is correct, access to the resource 324 can be provided. A software agent, bot or the like will be unable to discern the user challenge 312 from any momentary state of the dynamic composite image 314. Further, even after an elapsed period of time, the user challenge 312 will remain considerably masked and indistinguishable from the mask 310. Most advantageously, the user challenge 312 also periodically moves in the dynamic composite image 314 in a random direction independently determined for each period such that both the mask 310 and the user challenge 312 are moved randomly. This prevents a software agent from identifying aspects of the dynamic composite image 314 that never change as candidate aspects for the determination of the user challenge 312.

Notably, due to the extent of masking of the user challenge 312 in the dynamic composite image 314, and the indistinguishability of at least the boundaries between the user challenge 312 and the mask 310 in the dynamic composite image 314, the user challenge 312 cannot be readily discerned by automated means using techniques such as edge detection, component detection or element isolation. Thus embodiments of the present disclosure provide improved protection against attack or mimicking by automated agents or bots.

Figure 4:
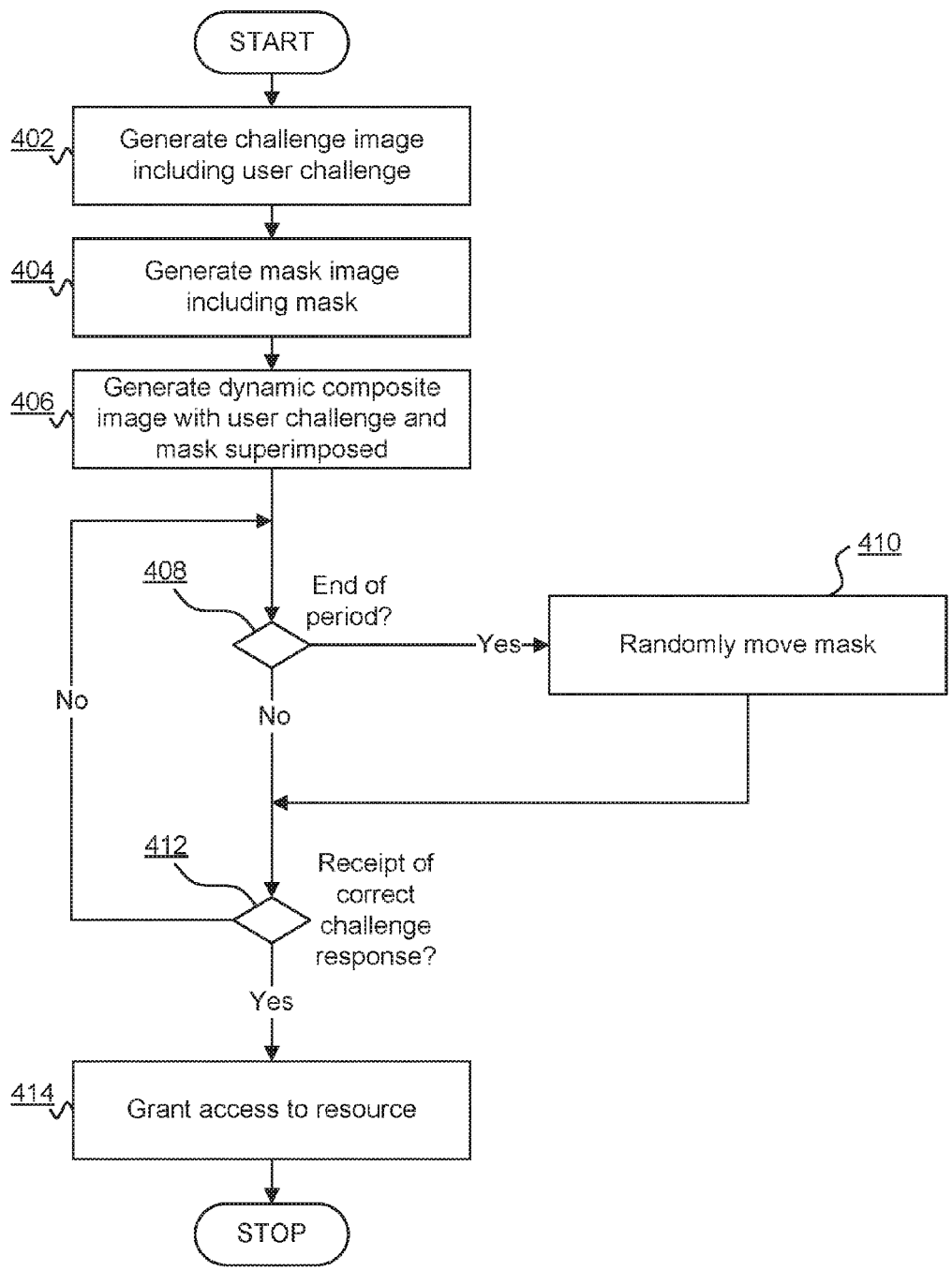
FIG. 4 is flowchart of an access control method for a resource in a computer system in accordance with embodiments of the present disclosure.

FIG. 4 is flowchart of an access control method for a resource 324 in a computer system 322 in accordance with embodiments of the present disclosure. Initially, at 402, the access controller 300 generates a challenge image 308 including a user challenge 312. Advantageously the user challenge 312 is randomly generated, such as generated by random selection of elements combined to constitute the user challenge 312. Such elements can include alphabetic characters, numeric characters, alphanumerics, images, drawings, symbols or the like. At 404 the access controller 300 generates a mask image 306 including a mask 310 substantially as hereinbefore described. Advantageously the mask is a random mask including mask elements distributed randomly across a full extent of the mask image 306. At 406 the composite image generator 302 of the access controller 300 generates a dynamic composite image 314 as a superimposition of the mask 310 and the user challenge 312 as hereinbefore described. The method subsequently iterates and at 408 the expiry of a period, or time interval, for movement of the mask 310 is detected. On expiry of the interval, the composite image generator 302 randomly moves the mask 310 component of the dynamic composite image 314 at 410. At 412 the method detects receipt of a correct response to the user challenge 312. On receipt of the correct response the access controller 300 grants access to the resource 324 at 414.

Figure 5:
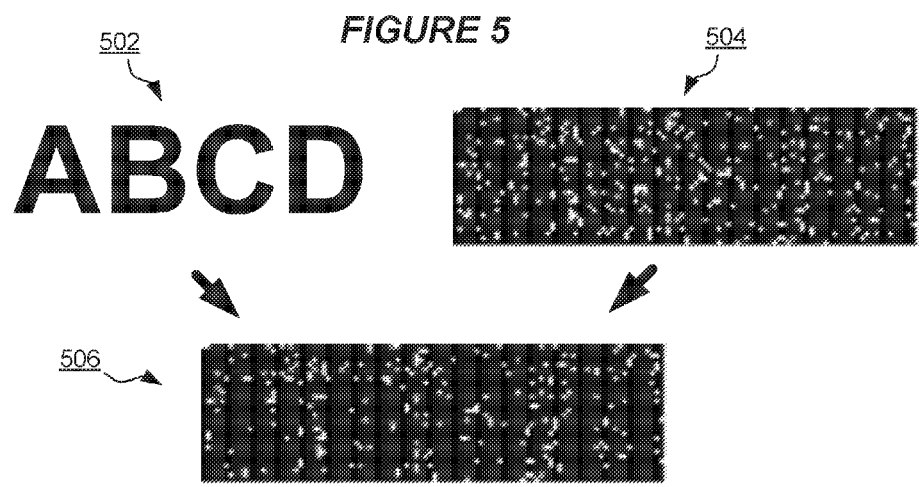
FIG. 5 depicts an exemplary composite image as a superimposition of a user challenge as part of a challenge image and a mask image having a mask at a point in time, where the user challenge is 90% masked by the mask in accordance with an embodiment of the present disclosure.

FIG. 5 depicts an exemplary composite image 506 as a superimposition of a user challenge 502 as part of a challenge image 308 and a mask image having a mask 504 at a point in time, where the user challenge 502 is 90% masked by the mask 504 in accordance with an embodiment of the present disclosure.

Figure 6:
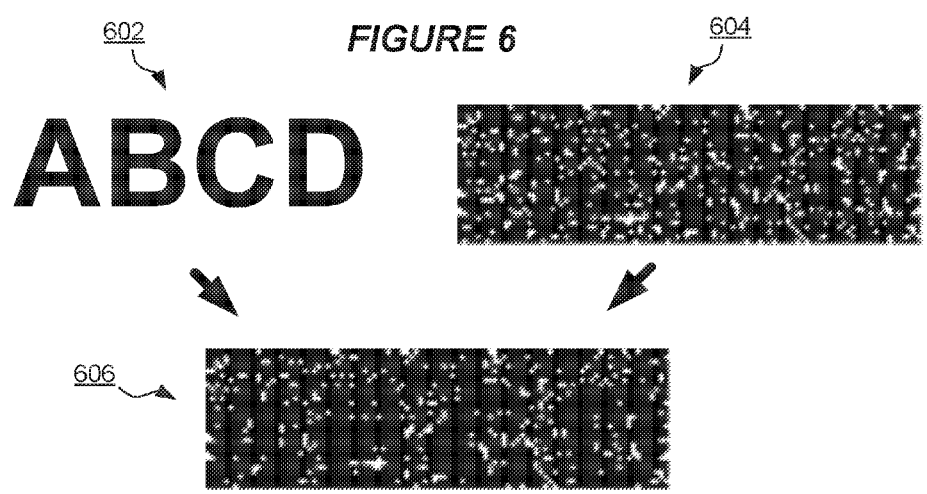
FIG. 6 depicts an exemplary composite image as a superimposition of a user challenge as part of a challenge image and a mask image having a mask at a point in time, where the user challenge is 85% masked by the mask in accordance with an embodiment of the present disclosure.

FIG. 6 depicts an exemplary composite image 606 as a superimposition of a user challenge 602 as part of a challenge image 308 and a mask image having a mask 604 at a point in time, where the user challenge 602 is 85% masked by the mask 604 in accordance with an embodiment of the present disclosure.

Figure 7:
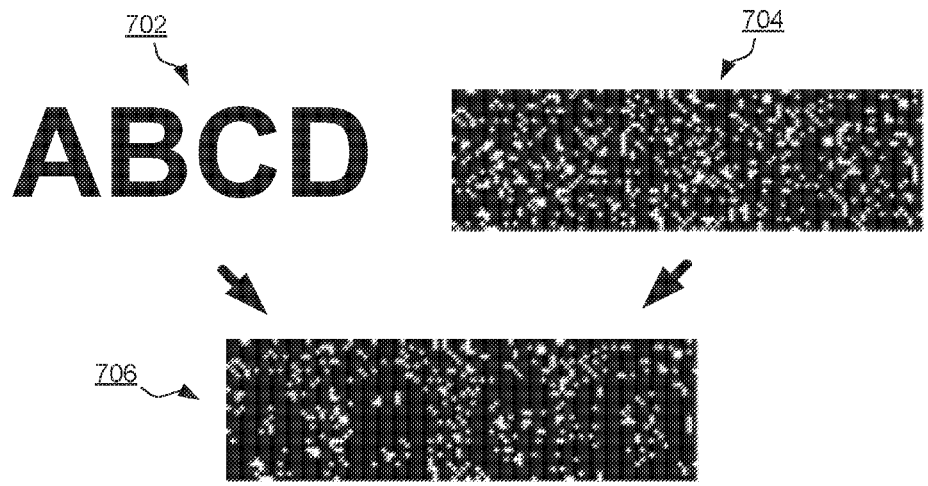
FIG. 7 depicts an exemplary composite image as a superimposition of a user challenge as part of a challenge image and a mask image having a mask at a point in time, where the user challenge is 80% masked by the mask in accordance with an embodiment of the present disclosure.

FIG. 7 depicts an exemplary composite image 706 as a superimposition of a user challenge 702 as part of a challenge image 308 and a mask image having a mask 704 at a point in time, where the user challenge 702 is 80% masked by the mask 704 in accordance with an embodiment of the present disclosure.

Figure 8:
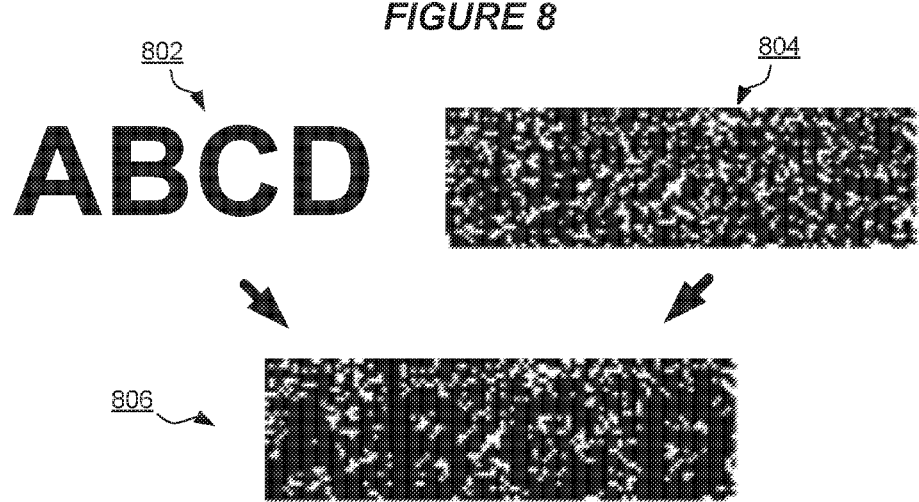
FIG. 8 depicts an exemplary composite image as a superimposition of a user challenge as part of a challenge image and a mask image having a mask at a point in time, where the user challenge is 75% masked by the mask in accordance with an embodiment of the present disclosure.

FIG. 8 depicts an exemplary composite image 806 as a superimposition of a user challenge 802 as part of a challenge image 308 and a mask image having a mask 804 at a point in time, where the user challenge 802 is 75% masked by the mask 804 in accordance with an embodiment of the present disclosure.

An embodiment of a prototype method illustrative of the generation of the dynamic composite image 314 is provided below in source code format. The source code generates a random user challenge 312 and a random mask 310 for superimposition as a dynamic composite image 314.

```
<html>
<head>
<script type="text/javascript">
var textimg;
var ctx;
var savearray=new Array;
var offset;
var captcha;
var mask_level=0.90; // Level of masking
var mask_speed=10;   // period
function getCaptchaString( ) //Generates the captcha string
{
 var a = String.fromCharCode(Math.ceil(Math.random( ) * 10)+ 64);
 var b = String.fromCharCode(Math.ceil(Math.random( ) * 10)+ 64);
 var c = String.fromCharCode(Math.ceil(Math.random( ) * 10)+ 64);
 var d = String.fromCharCode(Math.ceil(Math.random( ) * 10)+ 64);
 var code = a + ' ' + b + ' ' + ' ' + c + ' ' + d;
 return code;
}
function ValidCaptcha( )   // Validate the input
{
 var str1 = removeSpaces(document.getElementById('txtInput').value)
```

```
if (str1 == removeSpaces(captcha)) return 'Access Granted';
return 'Access Denied';
}
function removeSpaces(string)
{
return string.split(' ').join('');
}
function set_captcha( )
{
var canvas = document.getElementById('captchabox');
if (canvas.getContext)
{
  ctx = canvas.getContext('2d');
  ctx.font="30px Arial";
  ctx.globalAlpha=1;
  captcha = getCaptchaString( );
  ctx.fillStyle = "#000000";
  ctx.fillText(captcha, 0, 30, 100);
} else
{
  alert("Unsupported");
}
textimg=ctx.getImageData(0,0,100,30);
savearray = textimg.data;
for (var i=0;i<textimg.data.length;i+=4)
{
if (textimg.data[i+3]!=0)
{
 textimg.data[i]=0;
 textimg.data[i+1]=0;
 textimg.data[i+2]=0;
 textimg.data[i+3]=255;
 }
}
var num_pixels=(textimg.data.length)/4;
gen_random_mask(num_pixels, 1-mask_level);
offset=0;
renderimage( );
}
function MoveMask( )
{
 setInterval(function( )
 {
 renderimage( );
 if(Math.random( )>0.5){offset++;}else{offset--;}
 if(Math.random( )>0.5){offset+=textimg.width;}
 else{offset-=textimg.width;}
 }
 ,mask_speed);
}
function renderimage( )
{
 var inc=0;
 var width=textimg.width;
 var length=textimg.data.length;
 var height=textimg.height;
 var x_pos=offset%width;
 var y_pos=Math.floor(offset/height);
 var textimg_copy=ctx.createImageData(100,30);
 if (y_pos<0) {y_pos=0;}
 for (var i=0;i<textimg.data.length;i+=4)
 {
 inc = Math.round(i/4);
 if(random_mask[(((inc+x_pos)%width)+(((Math.round(inc/width)+
 y_pos)%height)*width))]==1)
 {
  textimg_copy.data[i]=0;
  textimg_copy.data[i+1]=0;
  textimg_copy.data[i+2]=0;
  textimg_copy.data[i+3]=255;
  } else
  {
  textimg_copy.data[i]=savearray[i];
  textimg_copy.data[i+1]=savearray[i+1];
  textimg_copy.data[i+2]=savearray[i+2];
  textimg_copy.data[i+3]=savearray[i+3];
  }
 }
 ctx.putImageData(textimg_copy,0,0);
}
var random_mask=new Array( );
function gen_random_mask(num_pixels, obscure_factor)
{
 var rand;
 for(var i=0; i < num_pixels; i++)
 {
 rand=(Math.random( )>obscure_factor)?1:0;
 random_mask[i] = rand;
 }
 return;
}
</script>
</head>
<body onload="set_captcha( );">
<canvas id="captchabox" width="120" height="50"></canvas>
</body>
<table>
<tr>
<td>
 <input type="text" id="txtCaptcha"
 style="background-image:url(1.jpg); text-align: left; border:none;
 font-weight:bold; font-family:Modern" />
 <input type="button" id="btnrefresh" value="Reveal" onclick=
 "MoveMask( );" />
</td>
</tr>
<tr>
<td>
 <input type="text" id="txtInput"/>
</td>
</tr>
<tr>
<td>
 <input id="Button1" type="button" value="Verify" onclick=
 "alert(ValidCaptcha( ));"/>
</td>
</tr>
</table>
</html>
```

Figure 9:
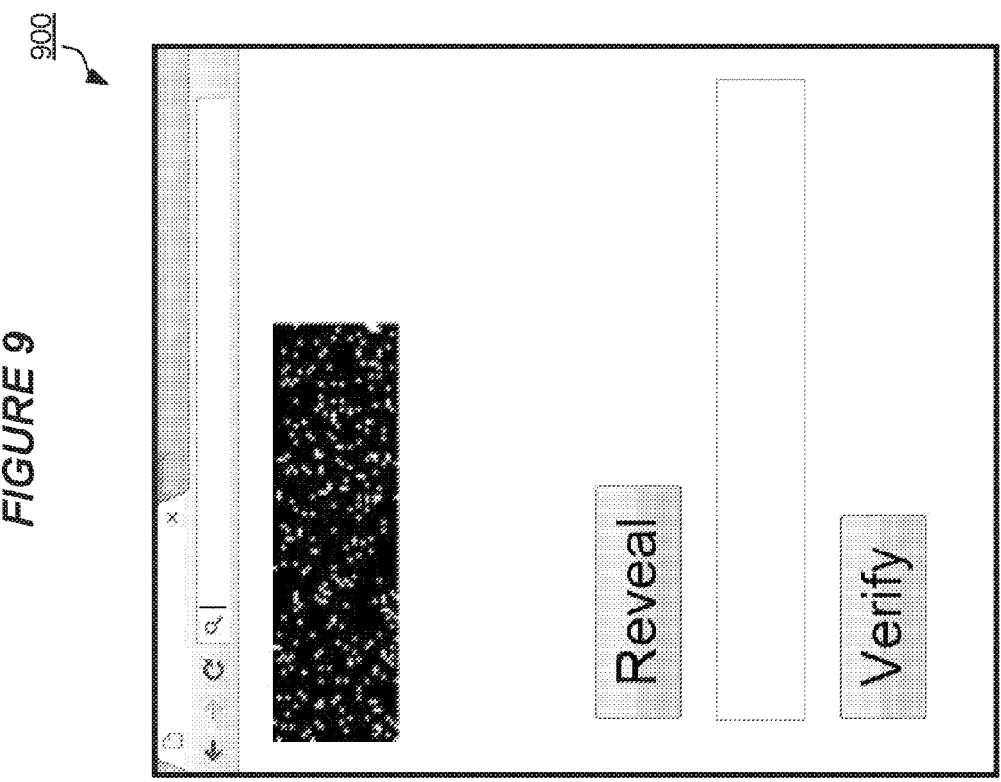
FIG. 9 is an exemplary output of an access control prototype illustrative of embodiments of the present disclosure.

FIG. 9 is an exemplary output 900 of the access control prototype provided in source code above and is illustrative of embodiments of the present disclosure. The 'Reveal' button causes display of the dynamic composite image 314 by commencing movement of a mask 310 portion of the composite image 314.

Figure 10:
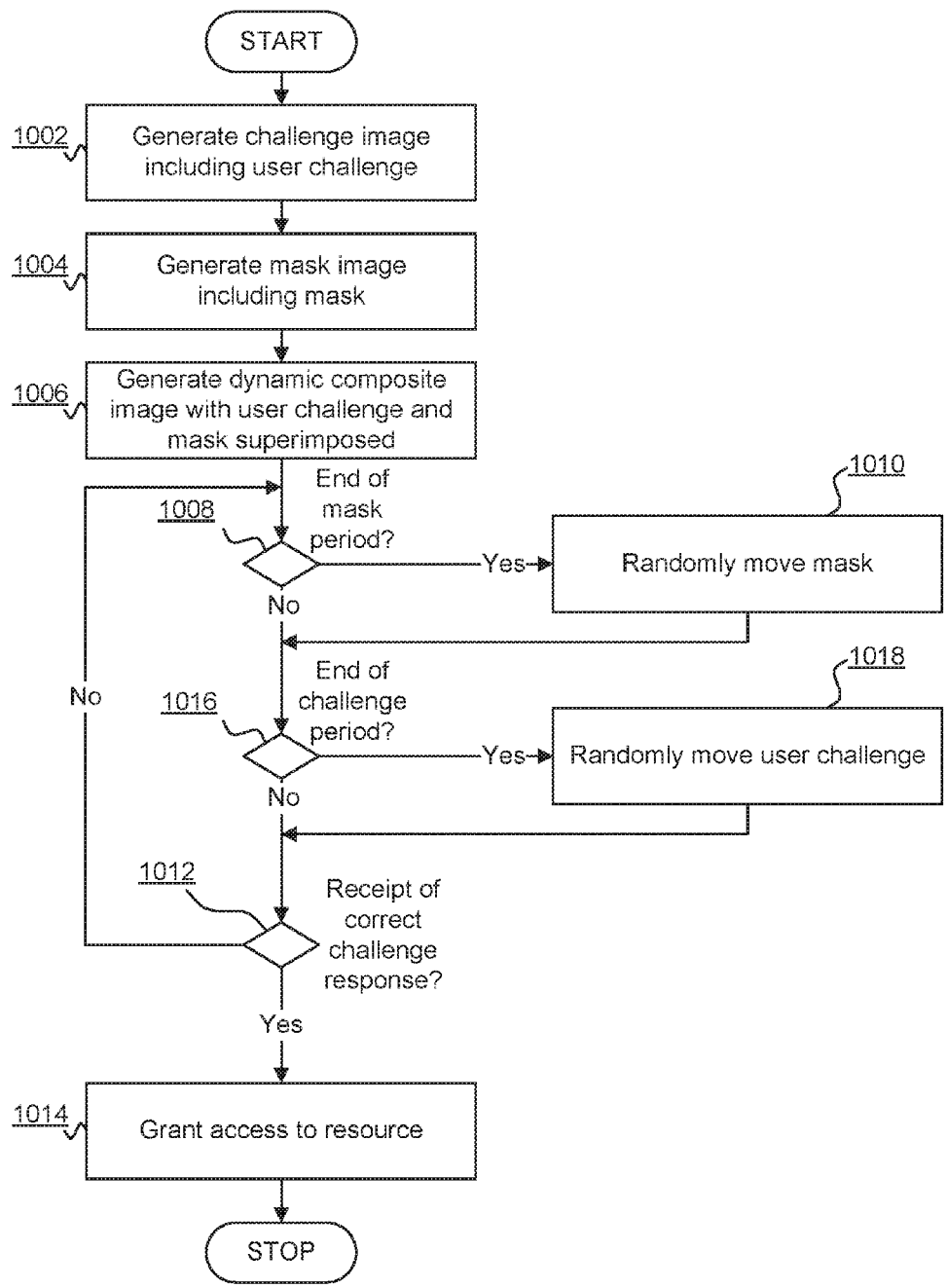
FIG. 10 is flowchart of an access control method for a resource in a computer system in accordance with an embodiment of the present disclosure.

FIG. 10 is flowchart of an access control method for a resource 324 in a computer system 322 in accordance with an embodiment of the present disclosure. The method of FIG. 10 is substantially the same as the method described above with respect to FIG. 4. In addition, the method of FIG. 10 includes an additional condition at 1016 to identify the expiry of a period, or time interval, for movement of the user challenge 312 component of the dynamic image 314. The user challenge 312 component is moved at 1018 at the expiry of each period. Thus the embodiment of FIG. 10 generates a dynamic composite image 314 in which the mask 310 and, advantageously, the user challenge 312 component move randomly. As hereinbefore described, the random movement of the mask 310 and user challenge 312 are different movement in order to prevent detection of the separate components.

In a further embodiment, a plurality of mask images 306 are generated, each including a different mask 310 substantially as hereinbefore described, and each being superimposed to generate the composite image 314. In such embodiments, each mask 310 may not mask the user challenge to the full extent of at least 70% masking provided all the masks taken in combination achieve such an extent of masking. Each mask moves randomly and differently in the dynamic composite image 314. Advantageously such an approach addresses any effort by automated software agents or bots to discern sets of image components or image elements in the composite image 314 to discern components or elements belonging to the user challenge 312. In an extension to such embodiments, one or more of the plurality of mask images 306 include masks having elements that can constitute user challenge elements. For example, a mask can include alphabetic elements taken from a character set. Thus, part of the challenge for a human user is to not only distinguish the user challenge 312 from the masks 310 but also to distinguish the user challenge 312 from a mask 310 appearing similar to a user challenge. For example, a user challenge 312 can be variable between alphabetics, numerics or combinations. Further, the user challenge can be variable between subsets of alphabetics, numeric or combinations. Accordingly the user challenge 312 can include a separately provided question to the user to identify a uniquely identifiable element in the composite image 314 such as "what is the text string in the image that is all numeric?". Where a mask includes alphabetics, a software agent or bot would require not only the cognitive ability of a human to discern and distinguish the user challenge, which will additionally identify masks appearing like user challenges, but further the ability to distinguish between a mask that appears like a user challenge and the actual user challenge 312. Further such similar questions can include, by way of example only: "what is the text string in the image that contains only vowels?"; "what is the text string in the image that contains only alphabetics occurring before G and after N in the alphabet?" and so on. Yet further, the challenge can require discerning features of multiple user challenges 312 or a user challenge 312 and a mask 310 appearing like a user challenge. For example, one user challenge 312 can include a numeric. Another user challenge 312 (or a mask 310 appearing like a user challenge) can include a further numeric. The challenge can include a requirement to perform a mental arithmetic operation on the two numerics to provide a correct response.

Figure 11:
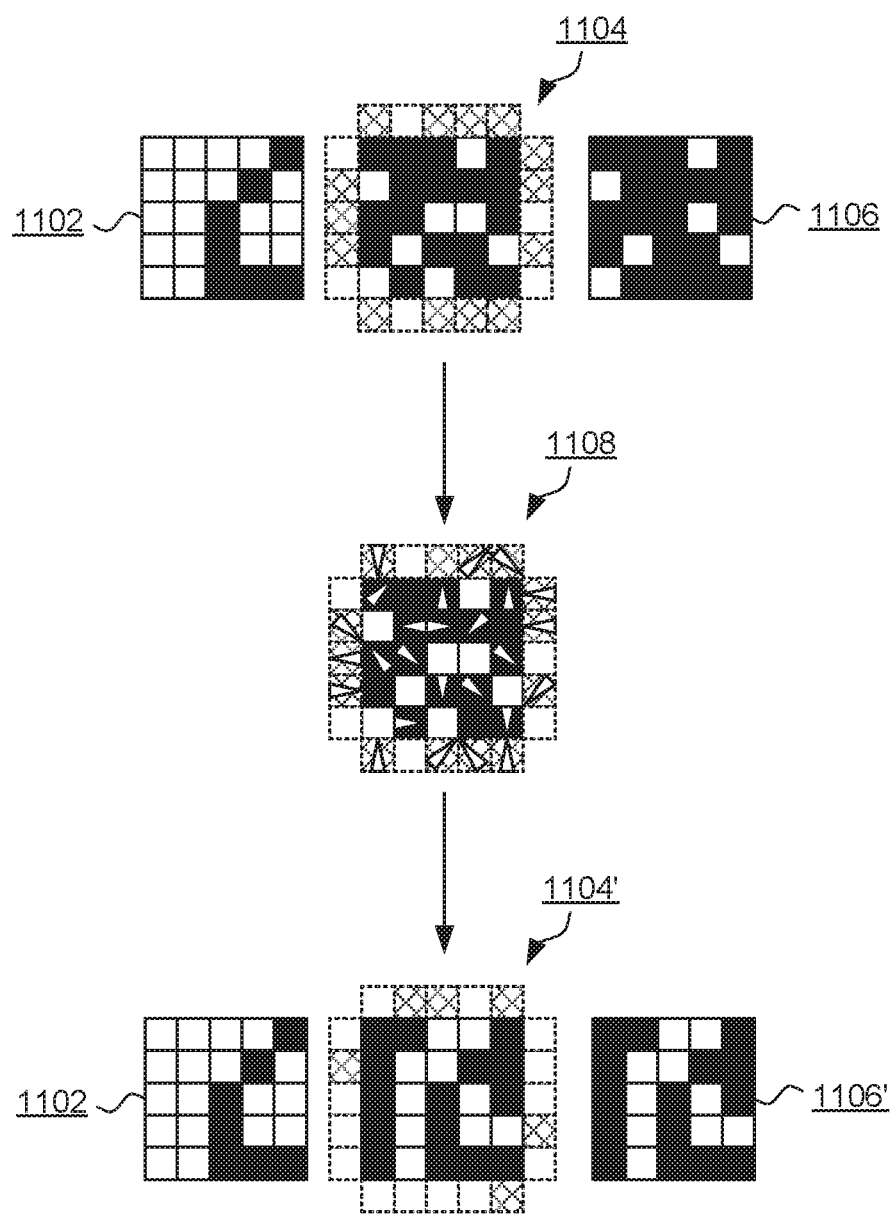
FIG. 11 depicts portions of an exemplary user challenge, portions of an exemplary mask and portions of a composite image in accordance with an embodiment of the present disclosure.

FIG. 11 depicts portions of an exemplary user challenge 1102, portions of an exemplary mask 1104, 1104' and portions of a composite image 1106, 1106' in accordance with an embodiment of the present disclosure. The exemplary user challenge 1102 is a top left portion of a capitalized letter "A" and is purely exemplary within a portion of a challenge image having twenty-five elements each being colored white or black as illustrated. The mask 1104 is a portion of a mask image 306 having twenty five mask elements being colored black or being transparent (indicated as white). Mask elements surrounding the portion of the mask 1104 are further indicated for reference, and are illustrated having broken lines and being hatched where non-transparent. A composite image 1106 portion is indicated as the user challenge portion 1102 with the mask portion 1104 superimposed, the mask portion 1104 being atop the challenge portion 1102. The composite image portion 1106 is a moment-in-time image from a dynamic composite image that is periodically updated.

In use, the mask portion 1104 is updated periodically by random movement of each of the mask elements in the mask portion (including the mask elements around the periphery of the mask portion indicated by broken lines). Thus, after expiry of a period (time interval) for the periodically updating dynamic composite image 1106, the mask elements in the mask portion 1104 are moved in random directions as indicated in the mask portion 1108. The mask portion 1108 is a copy of the mask portion 1104 with an indication of a random direction of movement (or, in the absence of such indication, the absence of any movement) for each mask element in the mask portion 1104. After movement of the mask elements in accordance with the indications in the mask portion 1108, an updated mask 1104' is provided for superimposition over the challenge portion 1102 as indicated as updated dynamic composite image portion 1106'. Thus, in use, individual elements of the mask portion 1104 move in random directions independently determined for the time period.

Annexes

Various annexes relating to embodiments of the disclosure will now be described.

Annexes 1 to 14 correspond to claims 1 to 14.

Annex 15: An access controller for a resource in a computer system, the access controller comprising: a data store having stored therein: a challenge image including a user challenge; a mask image including a mask; a composite image generator adapted to superimpose the challenge image and the mask image as a dynamic composite image such that the user challenge is partially masked by the mask in the composite image; and a display adapted to displaying the dynamic composite image to a user; a user input receiver, wherein the access controller is adapted to grant access to the resource on receipt, via the user input receiver, of a correct response by a user of the computer system to the challenge, wherein the user challenge is at least 70% masked by the mask, wherein the user challenge is indistinguishable from the mask at boundaries between the user challenge and the mask in the composite image, and wherein the composite image is dynamic by the mask randomly moving in the composite image periodically.

Annex 16: The access controller of annex 15 wherein the random movement of the mask is characterized by the mask moving in the composite image in a random direction independently determined for each period.

Annex 17: The access controller of any of annexes 15 and 16 wherein the user challenge periodically moves in the composite image in a random direction independently determined for each period.

Annex 18: The access controller of any of annexes 15 and 16 wherein the user challenge comprises a plurality of challenge elements and wherein each challenge element periodically moves in a random direction independently determined for each period.

Annex 19: The access controller of any of annexes 15 to 18 wherein the mask comprises a plurality of mask elements, the mask elements having spaces therebetween for revealing portions of the user challenge.

Annex 20: The access controller of annex 19 wherein the mask elements are random elements in at least one of: element size; and element location in the mask image.

Annex 21: The access controller of any of annexes 19 and 20 wherein the mask moves by movement of individual mask elements, each mask element moving in a random direction independently determined for each period.

Annex 22: The access controller of any of annexes 15 to 21 wherein the user challenge is at least 80% masked by the mask and at most 94% masked by the mask.

Annex 23: The access controller of any of annexes 15 to 22 wherein the user challenge includes colors and the mask consists exclusively of colors of the user challenge so as to provide that the user challenge is indistinguishable from the mask at boundaries between the user challenge and the mask in the composite image.

Annex 24: The access controller of any of annexes 15 to 23 wherein the user challenge and the mask are provided in substantially the same color so as to provide that the user challenge is indistinguishable from the mask at boundaries between the user challenge and the mask in the composite image.

Annex 25: The access controller of any of annexes 15 to 24 further comprising a recorder adapted to record the composite image periodically so as to generate a plurality of frames of the composite image.

Annex 26: The access controller of annex 25 wherein the plurality of frames is presented to the user as an animation.

Annex 27: The access controller of annex 26 wherein the animation is provided in a video data format.

Annex 28: The access controller of any of annexes 15 to 27 wherein the composite image is generated at a first computer system and communicated to a second computer system for provision to a user, and the user response is received from the second computer system by the first computer system.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. An access control method for a resource in a computer system comprising:
generating a challenge image including a user challenge;
generating a mask image including a mask;
generating a dynamic composite image comprising the challenge image and the mask image superimposed such that the user challenge is partially masked by the mask; and
granting access to the resource on receipt of a correct response by a user of the computer system to the challenge,
wherein the user challenge is at least 70% masked by the mask,
wherein the user challenge is indistinguishable from the mask at boundaries between the user challenge and the mask in the composite image by the mask and the challenge having one or more of: identical colors, textures or images,
wherein the composite image is dynamic by the mask randomly moving in the composite image periodically,
wherein the mask comprises a plurality of mask elements having spaces therebetween for revealing portions of the user challenge, and
wherein the mask moves by movement of individual mask elements, each individual mask element moving in a random direction independently for each period.

2. The method of claim 1 wherein the random movement of the mask is characterized by the mask moving in the composite image in a random direction independently determined for each period.

3. The method of claim 1 wherein the user challenge periodically moves in the composite image in a random direction independently determined for each period.

4. The method of claim 1 wherein the user challenge comprises a plurality of challenge elements and wherein each challenge element periodically moves in a random direction independently determined for each period.

5. The method of claim 1 wherein the mask elements are random elements in at least one of: element size; and element location in the mask image.

6. The method of claim 1 wherein the user challenge is at least 80% masked by the mask and at most 94% masked by the mask.

7. The method of claim 1 wherein the user challenge includes colors and the mask consists exclusively of colors of the user challenge so as to provide that the user challenge is indistinguishable from the mask at boundaries between the user challenge and the mask in the composite image.

8. The method of claim 1 wherein the user challenge and the mask are provided in substantially the same color so as to provide that the user challenge is indistinguishable from the mask at boundaries between the user challenge and the mask in the composite image.

9. The method of claim 1 wherein the composite image is periodically recorded so as to generate a plurality of frames of the composite image.

10. The method of claim 9 wherein the plurality of frames are presented to the user as an animation.

11. The method of claim 10 wherein the animation is provided in a video data format.

12. The method of claim 1 wherein the composite image is generated at a first computer system and communicated to a second computer system for provision to a user, and the user response is received from the second computer system by the first computer system.

13. An access controller for a resource in a computer system, the access controller comprising:
a data store having stored therein:
a challenge image including a user challenge, and
a mask image including a mask;
a composite image generator adapted to superimpose the challenge image and the mask image as a dynamic composite image such that the user challenge is partially masked by the mask in the composite image,
a display adapted to display the dynamic composite image to a user; and a user input receiver, wherein the access controller is adapted to grant access to the resource on receipt, via the user input receiver, of a correct response by a user of the computer system to the challenge, wherein the user challenge is at least 70% masked by the mask, wherein the user challenge is indistinguishable from the mask at boundaries between the user challenge and the mask in the composite image by the mask and the challenge having one or more of: identical colors, textures or images, wherein the composite image is dynamic by the mask randomly moving in the composite image periodically, wherein the mask comprises a plurality of mask elements having spaces therebetween for revealing portions of the user challenge, and wherein the mask moves by movement of individual mask elements, each individual mask element moving in a random direction independently for each period.

14. The access controller of claim 13 wherein the random movement of the mask is characterized by the mask moving in the composite image in a random direction independently determined for each period.

15. The access controller of claim 13 wherein the user challenge periodically moves in the composite image in a random direction independently determined for each period.

16. The access controller of claim 13 wherein the user challenge comprises a plurality of challenge elements and wherein each challenge element periodically moves in a random direction independently determined for each period.

17. A non-transitory computer-readable storage medium storing a computer program element comprising computer program code to, when loaded into a computer system and executed thereon, cause the computer to perform a method comprising:

generating a challenge image including a user challenge;

generating a mask image including a mask;

generating a dynamic composite image comprising the challenge image and the mask image superimposed such that the user challenge is partially masked by the mask; and granting access to the resource on receipt of a correct response by a user of the computer system to the challenge, wherein the user challenge is at least 70% masked by the mask, wherein the user challenge is indistinguishable from the mask at boundaries between the user challenge and the mask in the composite image by the mask and the challenge having one or more of: identical colors, textures or images, wherein the composite image is dynamic by the mask randomly moving in the composite image periodically, wherein the mask comprises a plurality of mask elements having spaces therebetween for revealing portions of the user challenge, and wherein the mask moves by movement of individual mask elements, each individual mask element moving in a random direction independently for each period.

* * * * *